United States Patent [19]

Pearce et al.

[11] 4,227,573

[45] Oct. 14, 1980

[54] REINFORCED SEAL UNIT FOR PUMPDOWN PISTONS OR WELL SWABS

[75] Inventors: Joseph L. Pearce, Dallas; Thomas W. Ray, Plano; Donald F. Taylor, Dallas; John H. Yonker, Carrollton, all of Tex.

[73] Assignee: Otis Engineering Corporation, Dallas, Tex.

[21] Appl. No.: 961,139

[22] Filed: Nov. 16, 1978

[51] Int. Cl.³ .............................................. E21B 33/12
[52] U.S. Cl. ................................. 166/153; 92/249; 277/235 R; 277/DIG. 6
[58] Field of Search ......................... 92/249, 251, 192; 166/152, 155, 153, 154, 156; 277/235 R, 213, DIG. 6

[56] References Cited

U.S. PATENT DOCUMENTS

| | | |
|---|---|---|
| 2,143,106 | 1/1939 | Freedlander ........................ 277/235 |
| 3,318,605 | 5/1967 | Brown . |
| 3,420,928 | 1/1969 | Brown . |
| 3,506,068 | 4/1970 | Brown . |
| 3,543,852 | 12/1970 | Taylor ................................. 166/155 |
| 4,050,517 | 9/1977 | Matthews ............................. 166/202 |

*Primary Examiner*—William F. Pate, III
*Attorney, Agent, or Firm*—Thomas R. Felger

[57] ABSTRACT

A piston for use as a TFL locomotive or well swab having a seal unit forming a fluid seal between the piston and the inner wall of a flow conductor or tubing string. The seal unit comprising at least one annular fin or lip extending radially from the piston. The annular fin or lip having an exterior portion formed from elastomeric material which is deformable to seal with the flow conductor and an interior portion formed from elastomeric material molded on wire mesh. The interior portion providing increased wear resistance and strength for the annular lip. In one version, the piston carries several individual seal units each having an annular lip.

15 Claims, 5 Drawing Figures

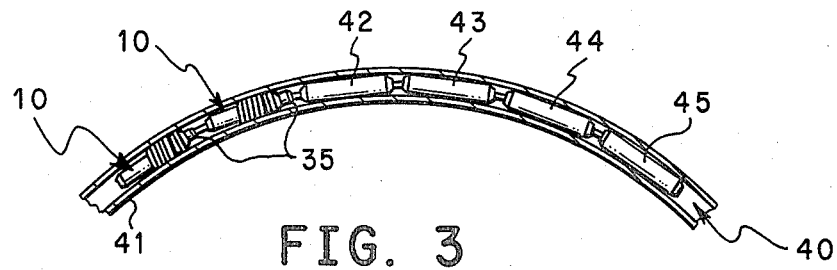
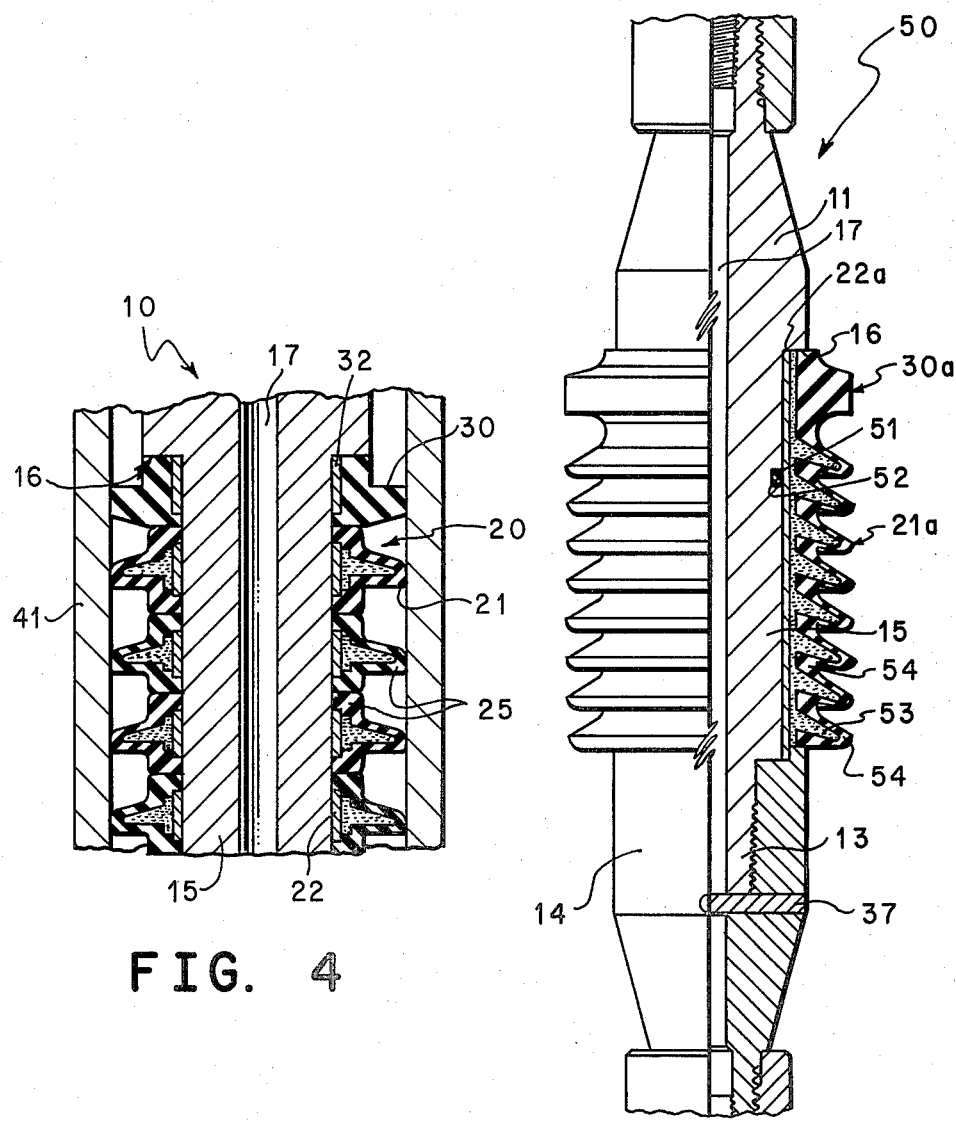
FIG. 3
FIG. 4
FIG. 5

REINFORCED SEAL UNIT FOR PUMPDOWN PISTONS OR WELL SWABS

BACKGROUND OF THE INVENTION

1. Field of the Invention

This invention relates to new and useful improvements in pumpdown pistons or impeller units used in pumpdown or through the flowline (TFL) operating systems. This invention may also be used on a well swab. The servicing of oil and gas wells by pumpdown or through the flowline (TFL) techniques has become more common as the number of offshore installations having satellite wells connected by flowlines to a central facility has increased. In some offshore installations, the well servicing equipment may have to travel as much as twenty miles through a flowline connecting the production platform to the underwater wellhead.

2. Description of the Prior Art

Many modifications have been developed for pumpdown pistons to reduce wear when the seal units rub against the interior surface of a flow conductor.

U.S. Pat. No. 4,078,810 to H. P. Arendt discloses a piston type seal unit having an annular choke ring. A predetermined value of differential pressure across the fins is used to expand the choke ring and thus reduce seal unit wear. U.S. Pat. No. 4,078,810 contains an excellent discussion of the working environment and design considerations in selecting a pumpdown or TFL piston.

U.S. Pat. No. 3,957,119 to J. H. Yonker shows a conventional pumpdown piston. U.S. Pat. No. 3,543,852 to Donald F. Taylor discloses a pumpdown piston having an internal bypass structure to limit the differential pressure across the seal units. U.S. Pat. No. 3,543,852 also discusses the construction of fins or lips on the seal unit to allow bypass flow around the exterior of the piston to limit the differential pressure across the seal unit.

SUMMARY OF THE INVENTION

The present invention is a piston for through the flowline (TFL) servicing of wells, comprising a mandrel means, a seal unit supported on the exterior of said mandrel means, an annular fin extending from said seal unit for engagement with the interior wall of said flowline, said annular fin having an interior portion comprising a wire mesh molded within an elastomer.

It is, therefore, a principal object of the invention to provide a new and improved piston for use as a fluid driven locomotive to propel tools along a flow conductor or as a well swab to lift liquid from wells.

It is another object of the invention to provide a piston of the character described which utilizes a combination of flexible annular lips and a deformable choke ring wherein the flexible annular lips have an interior portion formed from molding elastomeric material and wire mesh.

It is another object of the invention to provide a piston having a seal unit wherein the annular lip flares out against the conduit wall to prevent fluid bypass of the seal unit. The exterior portion of the annular lip being formed from elastomeric material and easily deformable to engage the conduit wall. The interior portion of the annular lip being formed from the same elastomeric material molded on wire mesh.

It is another object of the invention to provide a piston having a plurality of seal units. Each seal unit having an annular lip and being slidably mounted on the piston such that one damaged seal unit can be replaced without having to replace all seal units on the piston.

It is another object of the invention to provide a piston of the character described including annular fins or lips having an interior portion and an exterior portion. The cross section of each portion being similar.

It is another object of the invention to provide one embodiment of a piston of the character described including a seal unit mounted on a mandrel body comprising a slidable sleeve and a plurality of annular lips or fins mounted on the sleeve. The annular lips or fins being formed as part of an integral annular elastomer having an interior portion and an exterior portion. The interior portion comprising elastomeric material molded onto and surrounding a wire mesh.

It is another object of the invention to provide a piston of the character described which includes annular lips or fins having an interior portion formed from elastomeric material molded on wire mesh to provide improved wear characteristics and strength for the annular lips.

It is another object of the invention to provide a piston of the character described having a plurality of seal units slidably mounted on a mandrel means. Each seal unit having a backup ring with elastomeric material molded on the exterior and end surfaces thereof such that the elastomeric material forms a fluid seal between each backup ring and between the backup rings and the mandrel means.

In accordance with the present invention, there is provided a seal unit for use in a flow conductor as a pumpdown piston or as a well swab including a mandrel body having at least one end for connection with a tool string or a driving member. A backup ring slidably mounted on the mandrel body, and elastomeric material forming an annular lip or fin extending radially from the backup ring. The lips or fins each having an exterior portion formed from elastomeric material and an interior portion formed from elastomeric material bonded on wire mesh.

These and other objects and advantages of this invention will become apparent from the drawings, the claims and the detailed description which follows.

BRIEF DESCRIPTION OF THE DRAWINGS

In the drawings, like numerals indicate like parts and illustrative embodiments of the present invention are shown.

FIG. 3 is a fragmentary view in section and elevation of a tool train employing two pumpdown pistons positioned for travel through a flow conductor.

FIG. 4 is an enlarged fragmentary view in section of the seal units of the pumpdown piston illustrated in FIG. 1, showing the expansion of the annular choke and the flexing of the fins when subjected to a fluid pressure differential for displacing the piston through the flow conductor.

FIG. 5 is an alternative embodiment of the present invention having a continuous backup sleeve and seal unit.

DESCRIPTION OF THE PREFERRED EMBODIMENTS

Figures 1, 2:
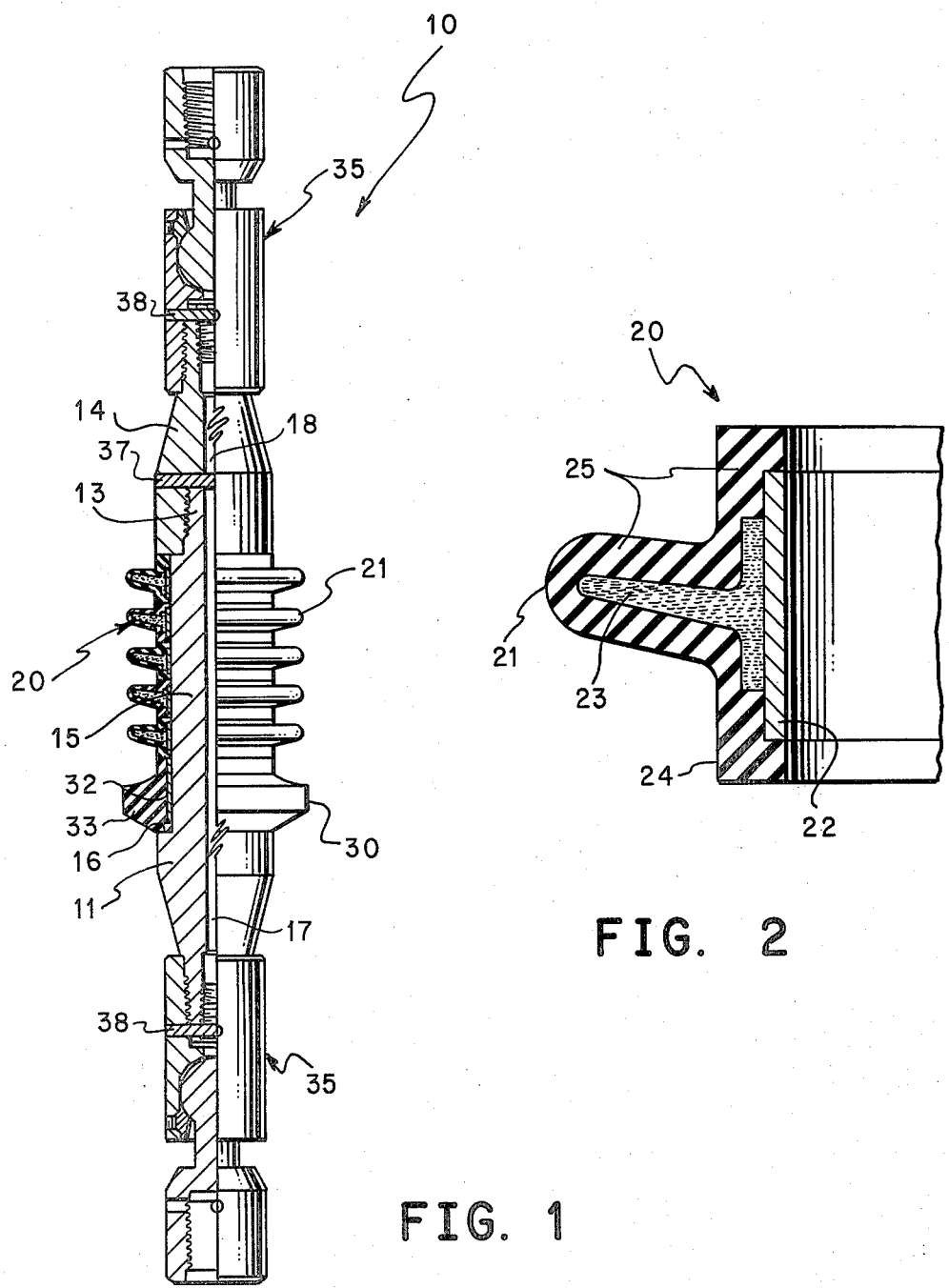
FIG. 1 is a longitudinal view, partially in section, of one form of a pumpdown piston embodying features of the invention.
FIG. 2 is an enlarged view, partially in section, of the seal unit used on the pumpdown piston shown in FIG. 1.

Referring to FIG. 1 of the drawings, a piston 10, constructed in accordance with the present invention, is shown including a mandrel body 11 having a reduced diameter externally threaded pin portion 13 on which is threaded a mandrel cap 14. Mandrel body 11 has a reduced diameter longitudinal central portion 15 on which a plurality of seal units 20 are slidably supported for limited longitudinal movement. The reduced portion 15 extends from an external annular stop shoulder 16 on mandrel body 11 to the threaded pin portion 13. Mandrel body 11 contains a longitudinal bore 17 which is shown aligned with a similar bore in mandrel cap 14. Bores 17 and 18 provide a flow passage for a limited amount of fluid to bypass seal units 20 reducing the total weight of piston 10 and regulating the pressure drop across piston 10.

Piston 10 is shown in FIG. 1 having five seal units 20 and one annular choke ring 30. The number of seal units 20 used on each piston can be varied depending upon the length of reduce portion 15 and the length of each seal unit 20. The function and design of annular choke ring 30 is fully explained in U.S. Pat. No. 4,078,810 to H. P. Arendt. U. S. Pat. No. 4,078,810 is incorporated by reference for all purposes in this description.

Each seal unit 20 as best shown in FIG. 2 comprises a metal backup ring 22 slidable over the reduced portion 15 and an elastomeric seal molded on the exterior of backup ring 22. The elastomeric seal comprises an annular fin 21 which extends from a cylindrical elastomeric body 24 which encapsules the exterior and end portions of back up ring 22. The inside diameter of body 24 is compatible with the inside diameter of backup ring 22 to provide a smooth surface for sliding seal unit 20 over reduced portion 15. The exterior portion 25 of the elastomeric seal is preferably formed from carboxylated nitrile or eurethane. The interior portion or core 23 of the elastomeric seal is a combination of elastomer bonded or molded to a wire mesh. The elastomeric material used to form the interior and exterior portions should preferably be the same. The wire mesh should preferably be monel or stainless steel. However, other types of metal mesh can be used as long as the elastomeric material, metal backup ring 22, and wire mesh are compatible. The cross section of interior portion 23 should approximate the cross section of exterior portion 25.

FIG. 4 shows an enlarged portion of piston 10 disposed within tubing 41 subjected to fluid flow in an upward direction. Fins 21 are in sealing engagement with the inside diameter of tubing 41. Exterior portion 25 is shown deformed to correspond to the inner wall of tubing 41. Interior portion 23 provides additional strength to improve the useful life of seal unit 20. The exterior portion 25 is easily deformed to provide an effective seal. The wire mesh of the interior portion 23 provides strength to reduce flexure failure.

Annular choke 30 is slidably mounted on reduced portion 15 and comprises an elastomeric seal 33 molded to backup ring 32 which is generally longer than backup ring 22 in seal unit 20. Since elastomeric seal 33 and body 24 encapsule the ends of their respective backup rings, there is no metal to metal contact between the backup rings. Also, the elastomeric material forms a seal with reduced portion 15 to prevent fluid flow between the backup rings and reduced portion 15. The seals, preventing fluid flow between backup rings 22 and 32 and reduced portion 15, are best shown in FIG. 4.

The opposite ends of piston 10 are each provided with a knuckle joint 35 to connect piston 10 in a pumpdown tool string. Pins 38 are used to secure knuckle joints 35 to piston 10. Such a tool string 40 is shown in FIG. 3 within a portion of low conduit or tubing 41. FIG. 3 illustrates a tool string 40 containing two pistons 10 and well tools 42, 43, 44 and 45. Each unit of tool string 40 is connected to the adjacent unit by a suitable coupling such as knuckle joint 35. The well tools 42-45 may comprise numerous combinations of pumpdown tools including paraffin cutter, safety valves, standing valves, hydraulic jars, etc., as shown in Otis Engineering Corporation Catalog No. OEC 5113A published January, 1978, OTIS PUMPDOWN COMPLETION EQUIPMENT AND SERVICE CATALOG. Depending on the particular load or force requirements of the servicing to be performed, several of the pistons 10 may be connected in tandem for displacing a tool train through a flow conductor. As illustrated in FIG. 3, two such pistons 10 are coupled with a string of four tools to be propelled through conduit 41. Since the pistons 10 are unidirectional in the sense that they are pumpable in one direction and bypass fluid in the opposite direction, it is necessary to install pistons facing in both directions in order to pump a tool string to a given location in a well and to return the tool string to the surface end of the well. For example, if a single piston unit is capable of carrying the tool string in one direction, the two piston units illustrated in FIG. 2 would face in opposite directions to permit the tool string to be pumped in both directions in the conduit. Generally, more than one piston unit would be included in each set installed in a given direction.

The interior portion 23 of seal unit 20 provides annular fin 21 with increased strength and wear resistance. However, if the annular fin 21 on one of the seal units 20 mounted piston 10 should become damaged, that particular seal unit 20 can be replaced without having to replace all of the other seal units 20. Prior art seal units on which several fins were molded on a continuous sleeve require replacement of the entire seal unit if one fin is damaged.

ALTERNATIVE EMBODIMENTS

FIG. 5 illustrates an alternative embodiment of the present invention. Piston 50 comprises a mandrel body 11 having a reduced portion 15 engaged with a mandrel cap 14 at threaded portion 13. Pin 37 prevents rotational forces from disengaging mandrel cap 14 and threaded portion 13. A continuous backup ring 22a is slidably supported on reduced portion 15 as opposed to several backup rings used on piston 10. An external annular recess 51 is machined in reduced portion 15 to receive o-ring 52. O-ring 52 prevents bypass fluid flow between the exterior of reduced portion 15 and the inside diameter of backup ring 22a.

The elastomeric seal is molded on the exterior of backup ring 22a as a single unit having an interior portion 53 and an exterior portion 54. Annular fins 21a and choke section 30a project radially from backup ring 22a. Exterior portion 54 is made from elastomeric material, preferably carboxylated nitrile or eurethane. Interior portion or core 53 consists of the same elastomeric material as exterior portion 54 dispersed in a wire mesh and molded thereto. Interior portion 53 and exterior portion 54 are molded as a single unit on the exterior of backup ring 22a. The cross section of interior portion 53 approximately corresponds to the cross section of exterior portion 54 in the vicinity of annular fins 21a. However, interior portion 53 does not contain a projection which corresponds to choke section 30a.

The orientation of fins 21a as shown on piston 50 would be appropriate for upward fluid flow past fins 21a to generate an upward force. The same flow in the downward direction past fins 21a would not generate the corresponding amount of downward force since fins 21a are oriented to allow bypass flow in the downward direction.

Well swabs are used to displace fluid from wells, to agitate fluid in wells, and in similar functions. The swab is normally pulled or driven mechanically along a well by a cable or a tubing handling string. Currently available swabs not only are deficient as swabs but also are not designed for the extreme requirements imposed on pumpdown pistons.

The various forms of pistons shown here are also useful as well swabs for lifting well liquids, agitating well liquids, and the like, in a well bore. As a swab the pistons may each be supported mechanically on a cable or a rigid handling string such as tubing. In lifting well liquids the liquid load above the pistons applies an energizing load resulting from a pressure differential across the seal unit deflecting the fins to shift the mounting sleeve expanding the choke section. In lowering the piston, the choke section goes down first with the fins folding inwardly allowing bypass permitting the piston to move through the liquid without energizing the choke ring. As the piston is lifted, the fins lead, expanding to lift liquids and energize and expand the choke ring.

The previously described invention can be readily adapted for use as a pumpdown or TFL piston or for use as a well swab. The previous description is illustrative of only two embodiments of the present invention. Changes and modifications will be readily apparent to those skilled in the art and may be made without departing from the scope of the invention which is defined in the claims.

What is claimed is:

1. A piston for through a flowline (TFL) servicing of wells, comprising:
   a. mandrel means;
   b. a seal unit supported on the exterior of the mandrel means;
   c. an annular fin extending from the seal unit for engagement with the interior wall of the flowline;
   d. the annular fin having an interior portion comprising a wire mesh molded within an elastomer;
   e. the cross section of the interior portion conforming to the cross section of the annular fin; and
   f. means for connecting the piston to other well tools.

2. A piston in accordance with claim 1 wherein the seal unit further, comprises:
   a. backup ring means slideable on the mandrel means; and
   b. the annular fin bonded to the backup ring and having an exterior portion of elastomeric material and an interior portion of elastomeric material and wire mesh molded to the backup ring.

3. The piston in accordance with claim 2 wherein the elastomeric material comprises carboxylated nitrile.

4. The piston in accordance with claim 2 wherein the wire mesh comprises monel.

5. The piston in accordance with claim 2, further comprising:
   a. a plurality of seal units with each unit having a single annular fin;
   b. each seal unit independently slidable on the mandrel means; and
   c. the elastomeric material of the exterior portion encapsulating the ends of the backup ring forming a fluid seal between the backup ring and the mandrel means.

6. A piston adapted for movement through a flow conductor, comprising:
   a. mandrel means;
   b. a seal unit, having at least one annular fin, mounted on said mandrel means;
   c. said annular fin comprising an exterior portion of elastomeric material covering a core of elastomeric material and wire mesh;
   d. means for attaching said piston to a tool string; and
   e. the elastomeric material comprising carboxylated nitrile.

7. The piston in accordance with claim 6 wherein the wire mesh comprises monel.

8. In a pumpdown piston for servicing wells through a flowline, a seal unit, comprising:
   a. backup ring means;
   b. an annular fin bonded to the backup ring means;
   c. an exterior portion of the fin formed from elastomeric material;
   d. an interior portion of the fin formed from elastomeric material bonded to wire mesh; and
   e. the cross section of the interior portion conforming to and proportionate with the cross section of the annular fin.

9. The seal unit as defined in claim 8 wherein the elastomeric material is carboxylated nitrile.

10. The seal unit as defined in claim 8 wherein the elastomeric material of the exterior portion encapsules the ends of the backup ring whereby a fluid tight seal is formed between adjacent backup rings.

11. In a well swab for lifting fluids from a well bore through a conduit, a seal unit, comprising:
    a. backup ring means;
    b. at least one annular fin bonded to the backup ring means;
    c. an exterior portion of the fin formed from elastomeric material;
    d. an interior portion of the fin formed from elastomeric material bonded to wire mesh; and
    e. the cross section of the interior portion conforming to the cross section of the annular fin.

12. A piston for through a flowline (TFL) servicing of wells, comprising:
    a. mandrel means;
    b. a seal unit supported on the exterior of the mandrel means;
    c. an annular fin extending from the seal unit for engagement with the interior wall of the flowline;
    d. the annular fin having an interior portion comprising a wire mesh molded within an elastomer;
    e. means for connecting the piston to other well tools;
    f. the seal unit comprising backup ring means slideable on the mandrel means;
    g. the annular fin bonded to the backup ring and having an exterior portion of elastomeric material and an interior portion of elastomeric material and wire mesh molded to the backup ring; and h. the elastomeric material comprising carboxylated nitrile.

13. The piston in accordance with claim 12 wherein the wire mesh comprises monel.

14. In a pumpdown piston for servicing wells through a flowline, a seal unit, comprising:
a. backup ring means;
b. an annular fin bonded on the backup ring means;
c. an exterial portion of the fin formed from elastomeric material; and
d. an interior portion of the fin formed from elastomeric material bonded to monel wire mesh.

15. The seal unit as defined in claim 14 wherein the elastomeric material comprises carboxylated nitrile.

* * * * *

UNITED STATES PATENT AND TRADEMARK OFFICE
CERTIFICATE OF CORRECTION

PATENT NO. : 4,227,573

DATED : October 14, 1980

INVENTOR(S) : Joseph L. Pearce, Thomas W. Ray, Donald F. Taylor, John H. Yonker

It is certified that error appears in the above—identified patent and that said Letters Patent is hereby corrected as shown below:

In column 3 line 23, "reduce" should read "reduced".

In column 4 line 7, delete [low] following "of" and insert --flow--.

In column 4 line 13, "cutter" should read "cutters".

In column 4 line 34, insert --and-- between "set" and "installed"

In column 4 line 42, delete [were] following "fins" and insert --are--.

In column 5 line 16, delete [well] following "a" and insert --flow conduit--.

In column 8 line 2, delete [exterial] and insert --exterior-- immediately following "an".

Signed and Sealed this

Seventeenth Day of March 1981

[SEAL]

Attest:

RENE D. TEGTMEYER

Attesting Officer    Acting Commissioner of Patents and Trademarks